US010425423B2

(12) United States Patent
Mukhin et al.

(10) Patent No.: US 10,425,423 B2
(45) Date of Patent: Sep. 24, 2019

(54) DEVICE ACCESS CONTROLS

(71) Applicant: Google LLC, Mountain View, CA (US)

(72) Inventors: Anton Sergeevich Mukhin, St. Petersburg (RU); Yuri Gennadievich Dolgov, St. Petersburg (RU); Christian Andrew Warren, San Francisco, CA (US); Yevgeniy Alexandrovich Gutnik, Cupertino, CA (US); Pavel Evgenievich Podivilov, St. Petersburg (RU); Roman Yurievich Shuvaev, St. Petersburg (RU); Robert Toscano, San Francisco, CA (US)

(73) Assignee: Google LLC, Mountain View, CA (US)

( * ) Notice: Subject to any disclaimer, the term of this patent is extended or adjusted under 35 U.S.C. 154(b) by 175 days.

(21) Appl. No.: 15/323,336

(22) PCT Filed: Aug. 6, 2014

(86) PCT No.: PCT/RU2014/000590
§ 371 (c)(1),
(2) Date: Dec. 30, 2016

(87) PCT Pub. No.: WO2016/022037
PCT Pub. Date: Feb. 11, 2016

(65) Prior Publication Data
US 2017/0142124 A1 May 18, 2017

(51) Int. Cl.
*H04L 29/06* (2006.01)
*G06F 21/30* (2013.01)
*G06F 21/62* (2013.01)
(52) U.S. Cl.
CPC .......... *H04L 63/105* (2013.01); *G06F 21/30* (2013.01); *G06F 21/6218* (2013.01);
(Continued)

(58) Field of Classification Search
CPC ........ G08C 19/00; H04W 24/00; G06F 17/27; G06F 15/16; G06F 21/30; G06F 21/6218;
(Continued)

(56) References Cited

U.S. PATENT DOCUMENTS

2009/0135008 A1* 5/2009 Kirchmeier ............ G06Q 10/06
340/540
2010/0121954 A1 5/2010 Yang et al.
(Continued)

FOREIGN PATENT DOCUMENTS

CN      103312920      9/2013
WO      9923591 A1     5/1999

OTHER PUBLICATIONS

International Search Report and Written Opinion from corresponding application PCT/RU2014/000590, dated May 13, 2015, 8 pages.
(Continued)

*Primary Examiner* — Thanhnga B Truong
(74) *Attorney, Agent, or Firm* — Colby Nipper PLLC

(57) ABSTRACT

A computer-implemented method includes identifying a set of electronic commands for operation of an electronic device, identifying a guest user, and designating permissions for the guest user, command-by-command, in the set of electronic commands for operating the electronic device. A designated permission for an electronic command in the set of electronic commands includes either granting the guest user access to the electronic device with a privilege of using the electronic command to operate the electronic device, or denying the guest user access to the electronic device and the privilege of using the electronic command to operate the electronic device.

21 Claims, 10 Drawing Sheets

(52) U.S. Cl.
CPC ............ *H04L 63/062* (2013.01); *H04L 63/08* (2013.01); *H04L 63/101* (2013.01); *G06F 2221/2141* (2013.01); *G06F 2221/2149* (2013.01)

(58) Field of Classification Search
CPC ......... H04N 7/18; G08B 21/00; H04M 11/00; H04L 63/062; H04L 63/08; H04L 63/101; H04L 63/105
USPC ........... 726/4, 1; 340/12.22, 540; 455/67.13, 455/412.2; 379/37, 41, 93.24, 45; 707/999.001; 713/164, 166
See application file for complete search history.

(56) References Cited

U.S. PATENT DOCUMENTS

2010/0162388 A1    6/2010   Baugher et al.
2014/0118121 A1*   5/2014   Cheung .................. G08C 19/00
                                                    340/12.22

OTHER PUBLICATIONS

Communication pursuant to Article 94(3) EPC for European Application No. 14846760.8, dated Aug. 20, 2018, 6 pages.
"Foreign Office Action", Chinese Application No. 201480080322.X, dated Feb. 20, 2019, 24 pages.
"Foreign Notice of Allowance", EP Application No. 14846760.8, dated Jul. 16, 2019, 51 pages.

* cited by examiner

DEVICE PERMISSON RECORD 400

Device Identifier = Printer 12c
401

| Electronic Command 402 | USER A 403 | USER B 404 | USER C 405 |
|---|---|---|---|
| COLOR PRINT | YES | NO | NO |
| DOUBLE_SIDE PRINT | NO | YES | NO |
| SELECT PAPER TRAY | NO | YES | YES |

Identify a set of electronic commands for operating an electronic device, each electronic command configured to trigger a corresponding operation of the electronic device;

82

Identify a guest user (e.g., from a request from the guest user to use the electronic device, and/or from amongst electronic accounts connected to an owner account of the electronic device)

83

Receive an instruction to designate, for the identified guest user, at least one permission for at least one electronic command in the set of the electronic commands for operating the electronic device, the at least one permission for the electronic command from the set of electronic commands including one of denying or granting, the identified guest user, authority to trigger the corresponding operation of the electronic device.

DEVICE ACCESS CONTROLS

CROSS REFERENCE TO RELATED APPLICATION

This application is a 35 U.S.C. § 371 National Phase Entry Application from PCT/RU2014/000590, filed Aug. 6, 2014, and designating the U.S, the disclosure of which is incorporated herein in its entirety by reference.

TECHNICAL FIELD

This description relates to providing a third-party user access to a device. In particular, the description relates to granting a third-party user access to devices registered with a wireless network or a cloud service account of a first-party user.

BACKGROUND

Machine-to-machine (M2M) and Internet of Things (IoT) technologies hold a promise to interconnect thousands, if not millions, of electronic devices together for exchanging data over wired or wireless networks.

In example known home or business contexts, a user may have may have deployed several electronic devices for personal or business use. Each of the devices may be set up with security features (e.g., user authentication and authorization protocols) so that the devices can be used or operated only by the user or by another user authorized by the owner. Because access control in these known environments may not be efficient, may be difficult to manage, can result in undesirable sharing scenarios, and/or so forth, improvements over these known systems is needed.

Consideration is now being given to methods and systems by which a user can share or make a device available for use by another user.

SUMMARY

In a home or business context, a first party may deploy an electronic device for personal use. Functions or operations of the electronic device, which may be a wireless-enabled or Internet-connected device, may be controlled by electronic commands or instructions transmitted from another electronic device (e.g., a remote controller) over a wireless network or the Internet. The electronic device may include or be configured with security features that may block access and operation of the electronic device by unauthorized users. The first party may share use of the electronic device with a third party user in a controlled manner, under a device-command security model, by granting permission or authorization to the guest user to issue selected electronic commands for at least some of the functions and operations of the electronic device.

In an aspect, a computer-implemented method involves identifying a set of electronic commands for operating an electronic device, each electronic command configured to trigger a corresponding operation of the electronic device, and identifying a guest user. The method further involves receiving an instruction to designate, for the identified guest user, at least one permission for at least one electronic command in the set of the electronic commands for operating the electronic device, the at least one permission for the electronic command from the set of electronic commands including one of denying or granting, the identified guest user, authority to trigger the corresponding operation of the electronic device.

In an aspect, a computer-implemented method involves identifying a set of electronic commands for operating an electronic device and identifying a guest user. The method further involves designating permissions for the guest user, command-by-command, in the set of electronic commands for operating the electronic device. A designated permission for an electronic command in the set of electronic commands includes one of granting the guest user access to the electronic device with a privilege of using the electronic command to operate the electronic device and denying the guest user the privilege of using the electronic command to operate the electronic device.

In an aspect, a system includes a processor coupled to a memory, a register of electronic devices including a subject electronic device and a register of device permissions. The register of device permissions includes a device permission record identifying the subject electronic device and includes a listing of electronic commands available for operating the subject electronic device. The system further includes a device permissions editor configured to receive external input for customizing the permissions associated with the listing of electronic commands included in the device permission record in response to a request to provide a guest user access to the subject electronic device.

The details of one or more implementations are set forth in the accompanying drawings and the description below. Other features will be apparent from the description and drawings, and from the claims.

BRIEF DESCRIPTION OF THE DRAWINGS

FIG. 4 is an illustration of an example device permission record for a device, in accordance with the principles of the present disclosure, in accordance with the principles of the disclosure herein.

FIGS. 8A and 8B are illustrations of example methods by which a first-party user can share use of an electronic device with a third-party user, in accordance with the principles of the disclosure herein.

Like reference symbols in the various drawings indicate like elements.

DETAILED DESCRIPTION

Figure 1:
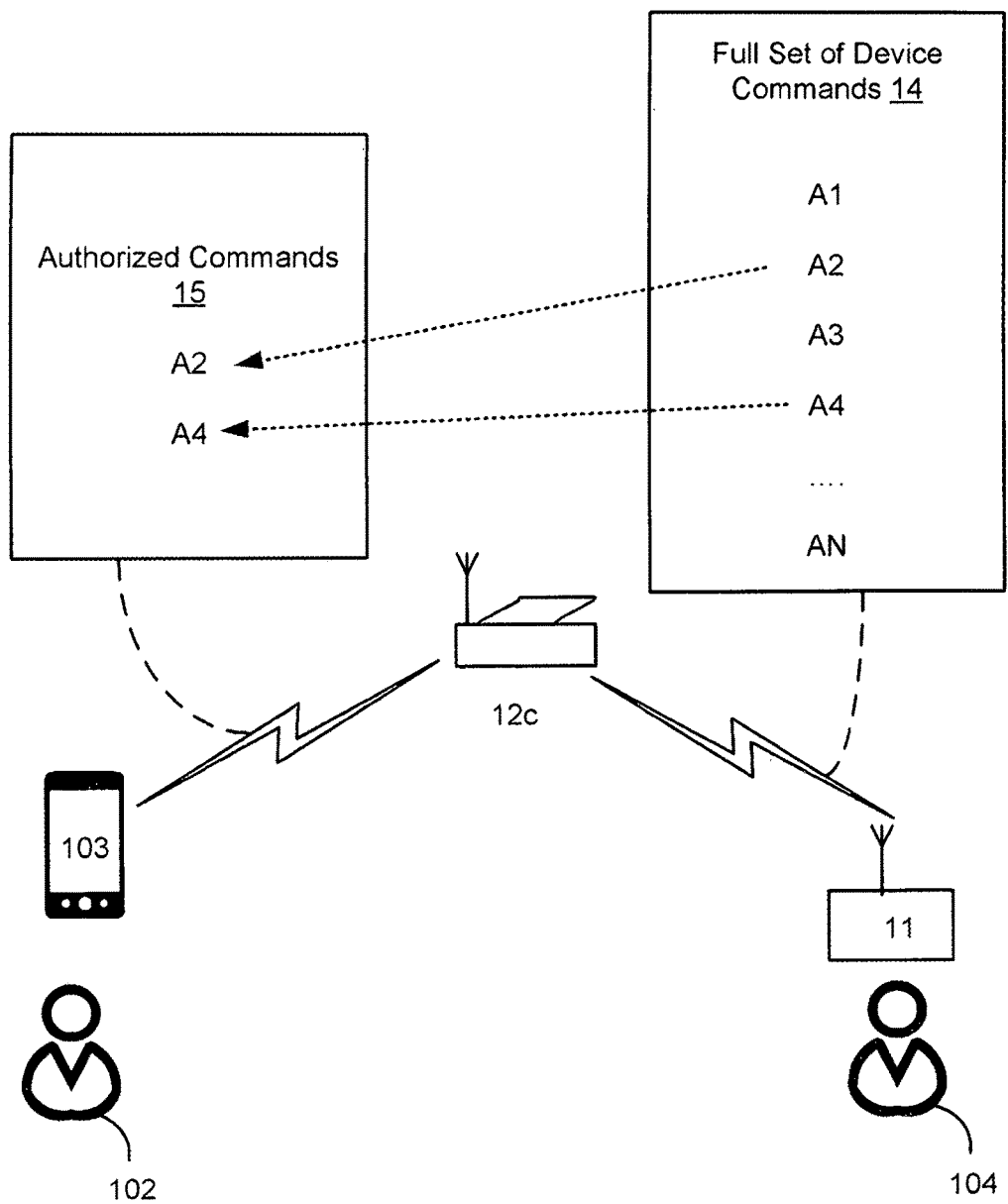
FIG. 1 is a schematic illustration of a scenario in which an owner has deployed an electronic device for use, but has shared use of the electronic device on a limited basis with a guest user, in accordance with the principles of the disclosure herein.

In a home or business context, as shown for example in FIG. 1, a first party ("an owner 104") may deploy an electronic device ("a first electronic device") (e.g., printer 12c) for personal use. Functions or operations of the first electronic device (e.g., printer 12c), which may be a wireless-enabled or Internet-connected device, may be controlled by a set of electronic commands or instructions (e.g., Full Set of Device Commands 14 represented as commands A1 through AN) transmitted (e.g., by owner 104) from a second electronic device (e.g., a remote controller 12i) over a wireless network or the Internet. The first and second electronic devices may include or be configured with security features that may block access and operation of the electronic devices by unauthorized users. The owner may share use of an electronic device (e.g., the first electronic device) with a third-party user ("a guest user 102") in a controlled manner or a limited basis, under a device-command security model, by granting permission or authorization to guest user 102 to use, for example, a restricted number (or subset) of electronic commands (e.g., Authorized Commands 15) for at least some of the functions and operations of the first electronic device (e.g., printer 12c), in accordance with the principles of the present disclosure. Guest user 102 may, for example, use another electronic device such as a smart phone 13 to transmit the authorized commands, over a wireless network or the Internet, to use the first electronic device (e.g., printer 12c).

In the device command-based security model, an electronic device may be used or operated by a set of device commands (also referred to herein as "electronic commands"), which may correspond to different software and hardware functions or operations of the electronic device that are available to or can be controlled by users (e.g. owner 104, guest user 102) of the electronic device. For example, for a printer device (e.g. printer 12c), a set of device commands (e.g., Full Set of Device Commands 14) governing the functions and operations of the printer device (printer 12c) available to users may include electronic commands such as "Printer On/Off," "Color Print," "Black and White Print," "Select Orientation," "Select Paper Tray," "Auto-Select Paper Tray," "Cancel Job," "Number of Copies," "Print Double Sided," "Number of Copies," etc. The device commands (e.g. A1-AN) may be electronic instructions (e.g., machine language or higher level language instructions), which are directed to place the device in different operational states or conditions (e.g., power on-off, reset, number of copies to be printed, etc.), and may include electronic instructions to have the device perform specific actions (e.g., download job, print job, cancel job, etc.) for the users (e.g., owner 104, guest user 102, etc.). The device commands can be directed to a subset of functionality of one or more devices. The device commands may correspond to commands (which may be actuated, for example, by physical actuators, push buttons or switches on an electronic device) to trigger or cause the electronic device to perform an action (e.g., one of an input action, an output action, or an action of setting an operational state of the electronic device for the input action or the output action).

In some implementations, different devices or device categories may have different capabilities and can have (or be associated with) different sets of device commands. In some implementations, models of a device category (e.g., models of a router) may have different capabilities and can have different sets of device commands. The different sets of device commands can overlap or can be mutually exclusive (or can have mutually exclusive portions).

For example, different varieties or models of printer devices may have different capabilities. Thus, different varieties or models of printer devices may have different sets of device commands (e.g., Full Set of Device Commands 14) available for use. For example, for a printer device (e.g., printer 12c) with limited capabilities (e.g., lacking color or double sided printing capabilities), the device commands (listed above as example commands in Full Set of Device Commands 14 for printer 12c) may have a single example command such as "Print" replacing example commands such as "Color Print," "Black and White Print," and "Print Double Sided."

Figure 2:
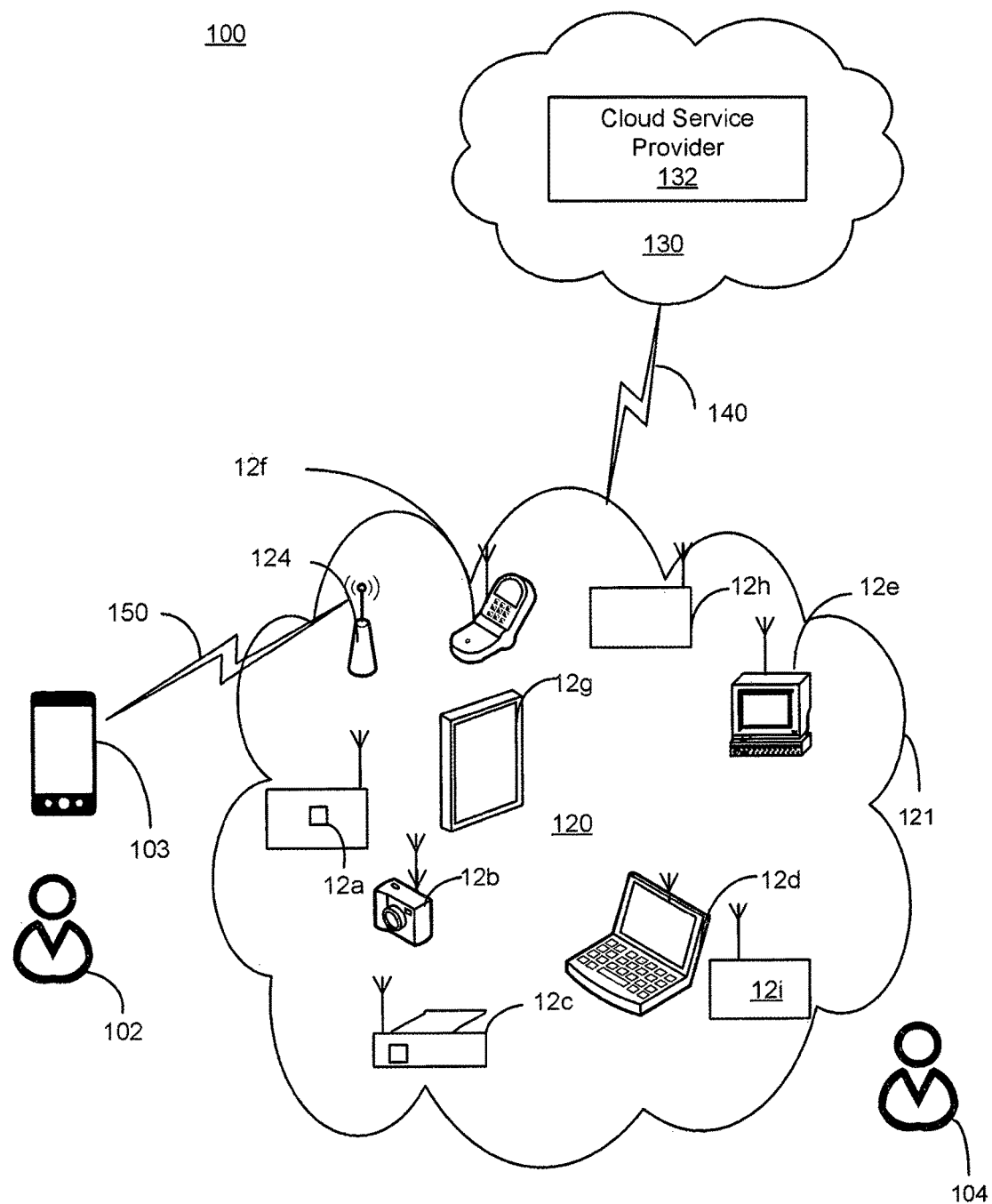
FIG. 2 is a schematic illustration of a home or business scenario in which an owner has deployed a set of electronic devices, in accordance with the principles of the disclosure herein.

Further, a different type or category of an electronic device (e.g., camera 12b, FIG. 2) may have a different set of device commands A1-AN (e.g., "Take Picture," "Delete All Pictures," "Export Pictures," "Power On/Off," "Copy Picture," "Turn Flash Mode On/Off," "Show Number of Pictures Taken," "Set Exposure Mode Manual," "Set Exposure Mode Auto," "Set Auto-Focus," etc.) available or included in Full Set of Commands 14), as may (or may not) be appropriate for the functions and operations of the other electronic device (e.g., camera 12b, FIG. 2). In some implementations, a set of device commands (or a portion thereof) can be excluded from some electronic devices. In some implementations, a set of device commands (or a portion thereof) can be included for some electronic devices.

Under the device command-based security model of the present disclosure, use of the electronic device (e.g., printer 12c) by a third party user (e.g., guest user 102) may be controlled or limited, for example, by restricting a number or type of the electronic commands that the third-party user is authorized to use to operate the electronic device. For example, as shown in Authorized Commands 15 (FIG. 1), under the device command security model, owner 104 may share printer 12c with guest user 103 on a only a limited basis, for example, by granting guest user 102 privileges to issue or use only a subset of the commands A1-AN in Full Set of Device Commands 14. Owner 104 may, for example, authorize guest user 102 to use only the subset of commands A2 and A4 (excluding other commands such as A1, A3, and so forth).

In an example of command-based limited sharing, commands A2 and A4 may be the printer 12c commands "Printer On/Off" and "Black and White Print," respectively. By authorizing guest user 102 to use only the subset of commands A2 and A4 (and excluding commands such as "Color Print"), owner 104 may limit sharing of printer 12c with guest user 104 to only black and white printing and exclude sharing printer 12c with guest user 104 for other functions and operations such as color printing.

The device command-based security model may also be extended to include time-based or location-based controls. For time-based controls, one or more of authorized commands 15 (FIG. 1) may be associated by owner 104 with time limits or time restrictions on when guest user 102 can use the command. For example, authorization for guest user 102 to use command A4 (e.g., "Black and White Print,")

may be limited to use only between the hours of 10:00 am and 3:00 pm, and/or only to weekdays, or only for the next three days, etc.

Similarly, for location-based controls one or more of authorized commands 15 (FIG. 1) may be associated by owner 104 with location limits or restrictions on from where the user 102 can use the command. For example, authorization for guest user 102 to use command A4 (e.g. "Black and White Print,") may be limited to use of printer 12*c* only when the guest user 102 is in a same building in which printer 12*c* is located, at a nearby hotel or airport, or within range of a Wi-Fi hotspot, etc. Use of location-based controls may involve means for determining a relative or absolute position of guest-user 102 (e.g., wireless cell-tower triangulation, use of ISP and cell tower location directories, etc.).

It will be understood that printer 12*c* (as shown for example in FIG. 1) may be only of several electronic devices that may be deployed by owner 104 in a home or business environment. FIG. 2 shows an example scenario 200 in which owner 104 may have deployed several electronic devices (e.g., a set of electronic devices 120) in a home or business environment.

As shown for example in FIG. 2, the set of electronic devices 120 may include any number of a variety of electronic devices (e.g., home appliances, consumer electronics, computer peripheral devices, etc.), which may, for example, be wireless or Internet-enabled devices. The set of electronic devices 120 may, for example, include a video recorder 12*a*, a digital camera 12*b*, printer 12*c*, a laptop computer 12*d*, a desktop computer 12*e*, a mobile phone 12*f*, a tablet computer 12*g*, a television 12*h*, remote controller 12*i* and other electronic devices (not shown). The set of electronic devices 120 may be interconnected via wired or wireless links. A wireless network 121 (e.g., a Wi-Fi network) may provide wireless connectivity or coverage extending over the set of electronic devices 120. A wireless access point 124, which may provide access to wireless network 121, may be part of the set of electronic devices 120 deployed or under the control of owner 104.

In some implementations, one or more of the set of electronic devices 120 may be Internet-connected devices (e.g., printer 12*c*, television 12*h*, etc.). Such Internet-connected devices may be registered in an owner-account with a cloud service provider (e.g., cloud service provider 132) hosted on the Internet (130). The owner (e.g., owner 104) may access or operate the Internet-connected devices (e.g., printer 12*c*, television 12*h*, etc.) using an Internet-connected electronic device (e.g., laptop computer 12*d*, tablet computer 12*g*, mobile phone 12*f*, remote controller 12*i*, etc.) after connecting or logging in to an owner-account with the cloud service provider 132 (e.g., over communication link 140 to Internet 130).

Each electronic device in the set of electronic devices 120 may include or be associated with security features (e.g., authentication features, authorization features), which block access and/or use thereof by unauthorized users. However, owner 104 may allow or authorize a third party-user (e.g., guest user 102 having smart phone 103 or other wireless-enabled electronic device) to use an electronic device (e.g., printer 12*c*) in the set of electronic devices 120.

Figure 3:
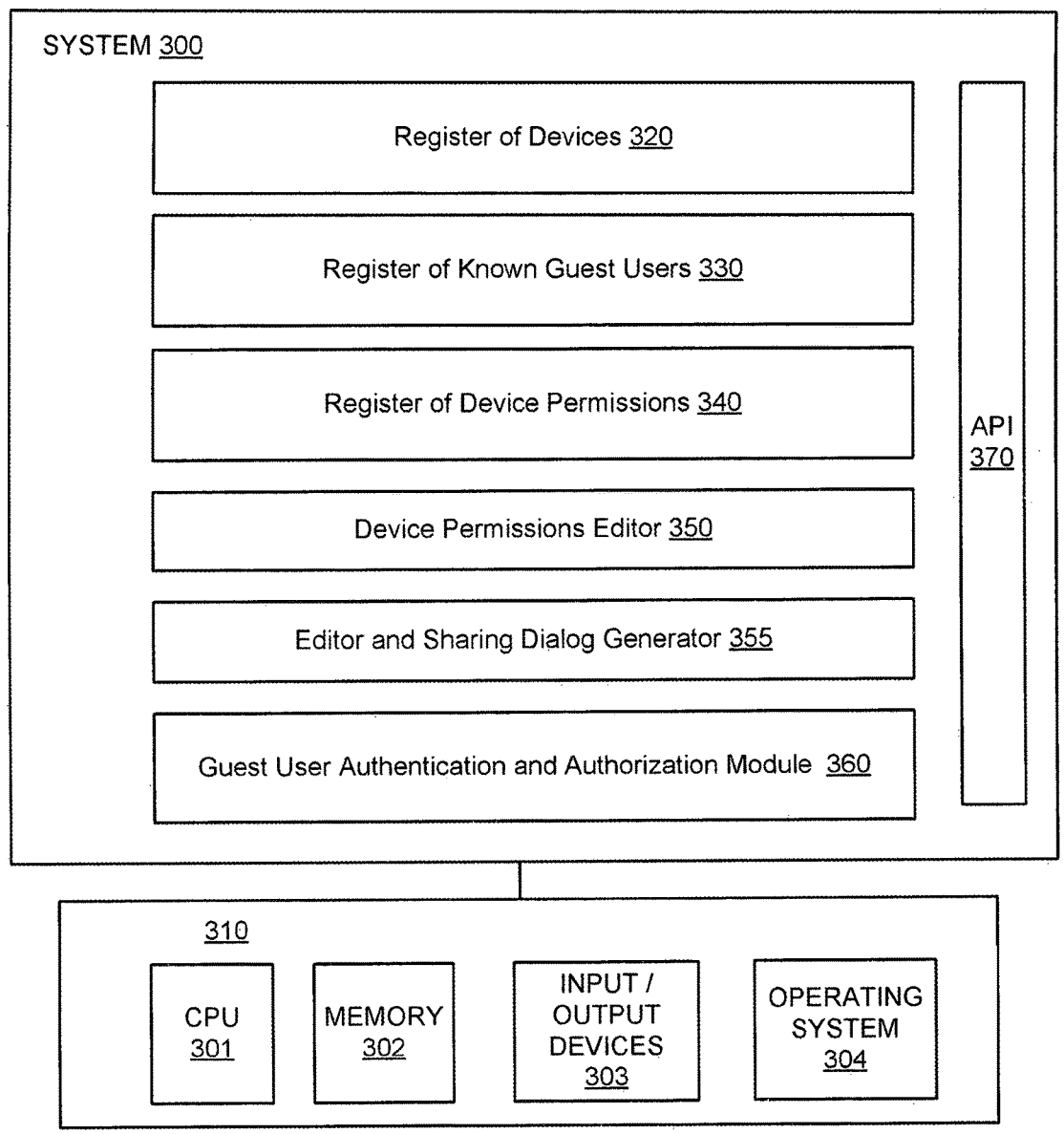
FIG. 3 is block diagram illustrating example components of a system, which is configured to enable an owner of a set of personal devices to grant device access or use privileges to guest users under a device command-based model, in accordance with the principles of the present disclosure.

FIG. 3 is block diagram illustrating example components of a system 300, which is configured to enable an owner (e.g., owner 104) of a set of personal devices (e.g., set of electronic devices 120) to grant device access or use privileges to guest users under the device command-based model, in accordance with the principles of the present disclosure.

System 300 may include a register of devices 320, a register of known guest users 330, a register of device permissions 340, a device permissions editor 350 associated with an editing and sharing dialog generator 355, and a guest user authentication and authorization module 360. System 300 may also include an application programming interface (API) 370, which may be configured to programmably couple an electronic device (e.g., an owner or guest user's electronic devices such as remote controller 12*i*, smart phone 103, tablet computer, etc.) with at least some of components 320-360 of system 300.

In some implementations, components 320-370 of system 300 may be hosted on one or more physical or virtual machines in a computer network. FIG. 3 shows, only for purposes of illustration, system 300 components hosted on a single computer 310. Computer 310 may include, for example, a CPU 301, a memory 302, Input Output Devices (I/O) 303 and Operating System 304. CPU 301 may be a semiconductor-based processor, and memory 302 may be a storage device configured to store data used by CPU 301 to perform certain functions. In an example implementation of system 300, computer 310 may be an electronic device (e.g., remote controller 12*i*) of owner 104. In another example implementation, computer 310 may be a server (not shown) hosted, for example, in the cloud (e.g., Internet 130) by cloud service provider 132 (FIG. 2).

In system 300, guest user authentication and authorization module 360 may include, or trigger execution of, one or more processes configured to authenticate users (e.g., guest users) and authorize users for connection to wireless network 121 and to individual devices in the set of electronic devices 120. Guest user authentication and authorization module 360 may be further configured to allow the guest users to access or use (i.e. issue or transmit electronic commands to operate) an individual device according to command-based device permissions, which may be stored in register of device permissions 340. In an implementation of system 300, some or all of the authentication and authorization functions and processes of guest user authentication and authorization module 360 may be provided by (e.g., may be implemented by) a cloud-service provider (e.g., cloud service provider 120) with whom owner 104 has a cloud-service account. In another implementation of system 300, some or all of the authentication and authorization functions and processes of guest user authentication and authorization module 360 may be performed on an electronic device (e.g., remote controller 12*i*) within the set of electronic devices 120 deployed by the owner 104.

In system 300, register of devices 320 may include a list of electronic devices (e.g., devices 12*a*-12*i*) in the set of electronic devices 120 deployed by the owner 104. Register of devices 320 may be maintained or edited, for example, by owner 104 or an administrator (e.g., cloud-service provider 132) so that register of devices 320 includes a current, or up-to-date, listing of the electronic devices in the set of electronic devices 120 deployed by the owner 104. Register of devices 320 may include not only device identifiers for the devices (e.g., devices 12*a*-12*i*) but may also include information related to device characteristics, functions and operations. The other information may, for example, include the electronic commands that may be available for operating the devices. For example, for printer 12*c*, register of devices 320 may include a listing of some or all of the electronic commands in Full Set of Device Commands 14 (e.g., "Printer On/Off," "Color Print," "Black and White Print," "Select Orientation," "Select Paper Tray," "Auto-Select Paper Tray," "Cancel Job," "Number of Copies," "Print Double Sided," "Number of Copies," etc.) that may be available for operating printer 12c.

Further, in system 300, register of known guest users 330 may include a list of known or potential guest users who may be likely candidates for grant of access privileges to one or more devices (e.g., devices 12a-12i) in the set of electronic devices 120 deployed by the owner 104. The list of known or potential guest users may be assembled or edited by owner 104, for example, by selecting third-party users who may be connected to the owner on a social network or other network, or who are otherwise known to owner 104. The one or more social networks on which the third-party users may be connected to owner 104 may, for example, include a social network provided by cloud service provider 132.

Register of guest users 330 may include not only guest user identifiers for the known or potential guest users (e.g., guest user 102) listed therein but may also include additional information related to the guest users (e.g., descriptive information on who the guest users are, e-mail, web or other electronic addresses, phone numbers, social network information such as friends circles and connections, representative icons used by the guest users on social networks, etc.).

In an example implementation of system 300, each known or potential guest user requesting access to (e.g., use) a device in the set of electronic devices 120 may be required to register with system 300 (e.g., with a user ID) and establish authentication credentials (e.g., a user name, a password or passcode, etc.) with guest user authentication and authorization module 360 before being included in the register of known guest users 330. The registered guest user may be able to use the authentication credentials (e.g., the password), for example, to connect to wireless network 121 via access point 124 or via an ad hoc wireless link to an "approved" device in the set of electronic devices 120 within the coverage range of wireless network 121.

In other instances of system 300, a known or potential guest user may be registered with system 300 without explicitly requesting access to or use of a device, based, for example, on social network connection information or other information available to owner 104. In such instances, guest user authentication and authorization module 360 may generate (e.g., automatically generate) authentication credentials (e.g., a password) that the known or potential guest user can use to connect his or her electronic device (e.g., smart phone 103) to wireless network 121 via access point 124 or via an ad hoc link to a device in the set of electronic devices 120.

An "authenticated and authorized" guest user may issue electronic commands over wireless network 121 from his or her electronic device (e.g. smart phone 103) to operate the "approved" device in the set of electronic devices 120. In cases where wireless network 121 and/or the "approved" device (e.g., printer 12c) are Internet-connected (i.e. "on-line"), the "authorized" guest user may be able to issue electronic commands over the Internet (e.g., Internet 130) from his or her electronic device (e.g. smart phone 103) to operate the "approved" device in the set of electronic devices 120.

In system 300, register of device permissions 340 may include individual device permission records for devices in the set of electronic devices 120. Each device permission record may identify a subject device, identify electronic commands that may be available for operating the subject device, and further identify the privileges that guest users may have been granted for issuing or executing particular electronic commands to operate the subject device.

FIG. 4 shows, for example, in table form, a device permission record 400 for a device (e.g., printer 12c), in accordance with the principles of the present disclosure. As shown in FIG. 4, device permission record 400 may include a device identifier 401 (identifying printer 12c), and a listing of available electronic commands (e.g., "Color Print," "Double-Side Print" and "Select Paper Tray") under a column heading "Electronic Commands" 402. In device permission record 400, user privileges (e.g., for Users A, B and C) for the available electronic commands (e.g., "Color Print," "Double-Side Print" and "Select Paper Tray") are shown, for example, as "YES" or "NO" text entries under column headings 403-405 that respectively identify Users A, B and C.

With renewed reference to FIG. 3, in system 300, device permissions editor 350, which may be coupled to an editing and sharing dialog generator 355, may be configured to receive owner input for editing device permission records in register of device permissions 340. The owner (e.g., owner 104) may invoke device permissions editor 350 (via API 370), for example, to add a new device permission record or to modify an existing device permission record (e.g., device permission record 400 for printer 12c) in register of device permissions 340. The device permissions editor 350 may be configured to receive external input for customizing the permissions associated with the listing of electronic commands included in the device permission record in response to a request to provide a guest user access to the subject electronic device. The request may be a request to provide access to the guest user within a predefined threshold distance (e.g., 10 meters, 100 meters, 1000 meters, etc.) of the subject electronic device.

To facilitate customizing of the device permission records in register of device permissions 340 by the owner (e.g., owner 104), editing and sharing dialog generator 355 may generate and present one or more interactive or informational displays (also referred to herein as "sharing dialogs") on a user interface of an electronic device (a desktop computer, a laptop computer, a tablet or notebook computer, a smart phone, etc.) that the owner may use to connect to system 300. The interactive or informational displays may include status information (e.g., available electronic devices, known or potential users, etc.) and/or interactive data input elements (e.g. text entry fields and graphical elements such as windows, menus, radio buttons, and check boxes, etc.) to facilitate editing of a device permission record.

Figure 5:
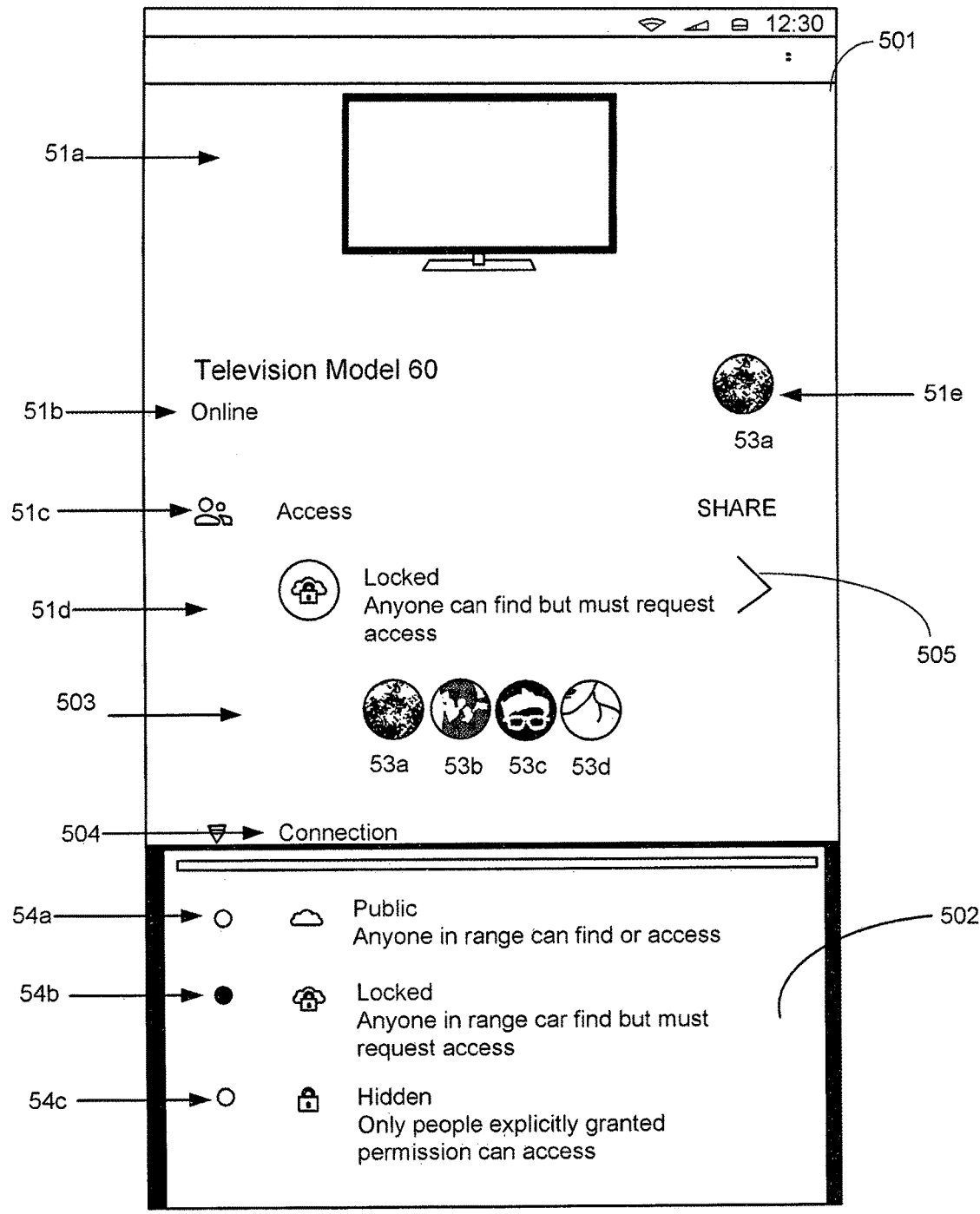
FIG. 5 is an illustration of an informational and interactive display, in accordance with the principles of the disclosure herein.
Figure 6:
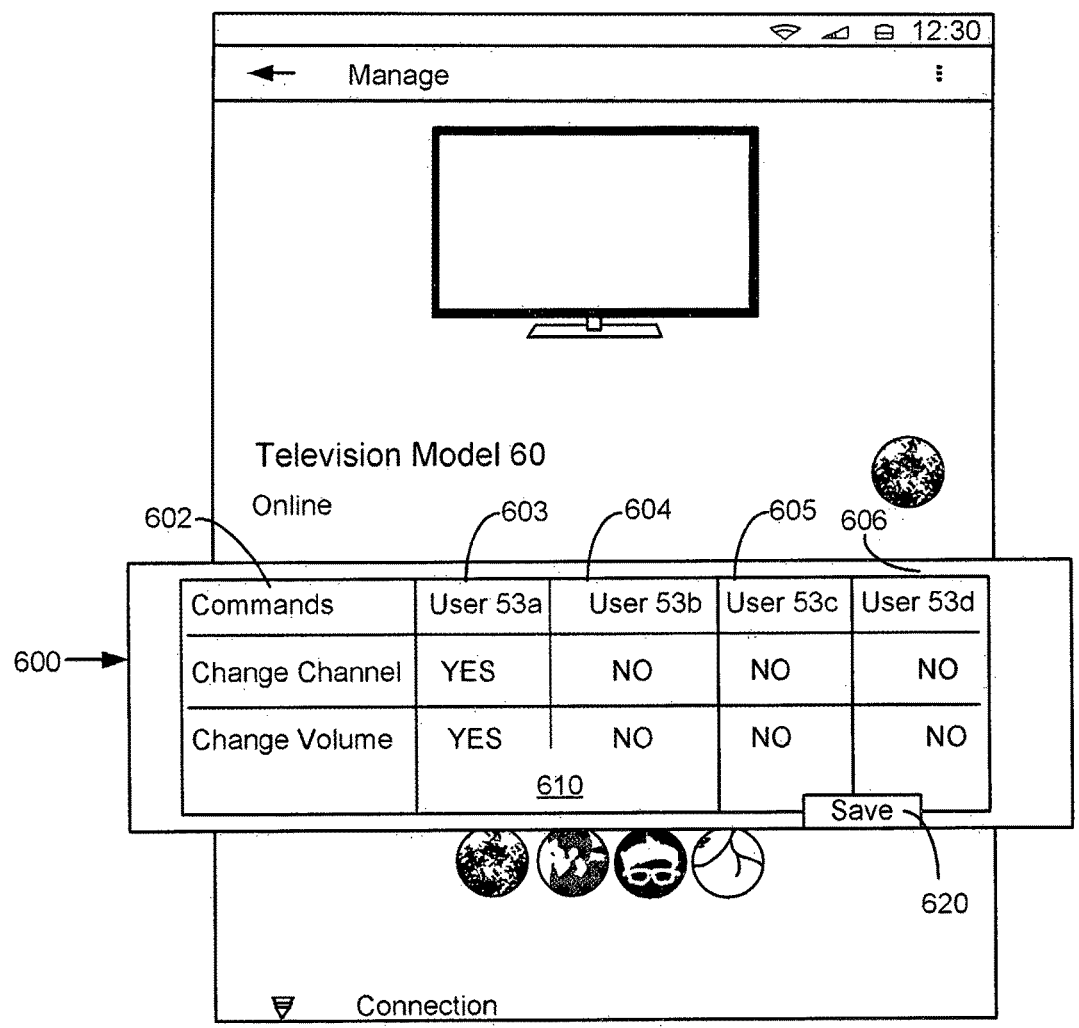
FIG. 6 is an illustration of an interactive display window to enable editing or modification of the device permission record, in accordance with the principles of the present disclosure.

FIGS. 5 and 6 show an example informational and interactive display 500, which may be generated by editing and sharing dialog generator 355 and presented on the user interface of an electronic device, in accordance with the principles of the present disclosure.

Informational and interactive display 500 (generated by editing and sharing dialog generator 355 and presented on the user interface of the owner's electronic device), which may also be referred to herein as a "sharing dialog," may relate to an example scenario involving guest user permissions for access to an Internet-connected device (e.g., television 12h) in the set of electronic devices 120. In the example scenario, known or potential guest users (e.g., user 53a, user 53b, user 53c and user 53d) may be persons that are connected to the owner (e.g., owner 104) over a social network or other network, or otherwise known to the owner.

As shown in FIG. 5, informational and interactive display 500 ("display 500") may include status information about sharing use of television 12h with guest users. The status information, which may, for example, be displayed in a window 501 on a user interface of an electronic device of the owner (e.g., remote controller 12*i*), may include an image (51*a*) of television 12*h* (which may help identify and remind the owner/viewer that the subject device under consideration is television 12*h*). Window 501 may also include graphic or textual information (503) identifying the known and potential guest users (e.g., user 53*a*, user 53*b*, user 53*c* and user 53*d*). User 53*a*, user 53*b*, user 53*c* and user 53*d* may be identified, for example, by corresponding representative graphic or pictorial icons.

Window 501 may further include a text field (51*b*) with a value "Online" indicating that the television 12*h* is an Internet-connected device, a graphic or text field 51*c* with a value "Access-Shared" indicating that access to television 12*h* is shared with or that access to television 12*h* has been requested by at least one guest user (e.g., user 53*a*). The at least one guest user (e.g., user 53*a*) requesting access to television 12*h* may, for example, be further visually identified in text and graphic field 51*e* in window 501.

The status information included display 500 may further include an activable link "connections" (504), which may open a window (e.g., pop-up window 502) displaying a status of a selectable "discoverability" mode (e.g., "Public," "Locked," or "Hidden") of television 12*h*, which mode may relate to the public discoverability characteristics of television 12*h* over a wireless network (e.g., wireless network 121) or the Internet (e.g., Internet 130). The selectable discoverability modes (e.g., "Public", "Locked" or "Hidden" modes) may respectively correspond, for example, to a first scenario in which any guest user in wireless range can find and access television 12*h*, a second scenario in which any guest user in wireless range can find or discover television 12*h* but must specifically request access, and a third scenario in which only guest users who have been explicitly granted permission can find, discover or access television 12*h*. Link "connections" 504 when activated or opened (e.g., by owner 104/viewer) may, for example, further reveal interactive radio button indicators Public (54*a*), Locked (54*b*), Hidden (54*c*) in window 502 (e.g., a pop-up window) on display 500. Interactive radio buttons Public 54*a*, Locked 54*b*, Hidden 54*c*, may enable the owner or viewer to select or change the public discoverability mode of television 12*h* to correspond to the first scenario, the second scenario, or the third scenario mentioned above.

As shown in FIG. 5 visually, for example, by a darkening of radio button Locked 54*b*, the second scenario (in which any guest user in wireless range can find or discover television 12*h*, but must specifically request access) may have been previously selected. The "Locked" status of television 12*h* corresponding to darkened radio button Locked 54*b* may be displayed as graphic and textual information (e.g., "Anyone can find but must request") (51*d*) in window 501 on display 500.

Window 501 may further include, for example, an interactive link ">" 505 (displayed next to the text "Anyone can find but must request" (51*d*)). Interactive link ">" 505 when activated may open an interactive display window (e.g., pop-up window 600, FIG. 6) to enable editing or modification of the device permission record for television 12*h* (e.g., device permission record 610), which may have been previously stored, for example, in register of device permissions 340 (FIG. 3).

Like device permission record 400 for printer 12*c* shown in FIG. 4, example device permission record 610 for television 12*h* may be displayed in window 600 in an editable table form. Example device permission record 610 for television 12*h*, as shown in FIG. 6, may include a listing of electronic commands (e.g., "Change Channel," and "Change Volume"), which may be available for sharing with guest users, under a column heading "Commands" 602. User privileges (e.g., for users 53*a*, 53*b*, 53*c* and 53*d*) for the available commands may be shown, for example, as "YES" or "NO" entries under column headings 603-606 that respectively identify, for example, users 53*a*, 53*b*, 53*c* and 53*d*.

Device permission record 610 for television 12*h* (as shown for example in FIG. 6) may correspond to the status information displayed on display 500 (FIG. 5) with user 53*a* marked with YES entries for privileges to the "Change Channel," and "Change Volume" commands for television 12*h* that are listed under column heading Commands 602. The owner/viewer may edit device permissions record 610 in window 600, for example, by changing the "YES" or "NO" entries, command-by-command, under column headings 603-606 that respectively identify users 53*a*, 53*b*, 53*c* and 53*d*. The owner may, for example, change the "YES" entry for the command "Change Channel" under column heading 603 to a "NO" entry to terminate or end user 53*a* privileges to change channels on television 12*h* (not shown). The owner may further, for example, leave the "YES" entry for the command "Change Volume" under column heading 603 unchanged to let user 53*a* keep privileges to change volumes on television 12*h*. Similarly, the owner may, for example, change the "NO" entries under column heading 605, command-by-command, to "YES" entries to grant user privileges to user 53*c* (not shown). Window 600 may include a "Save" button 620, which the owner/viewer can activate to save the edited device permission record 610 in register of device permissions 340 (FIG. 3).

Figure 7:
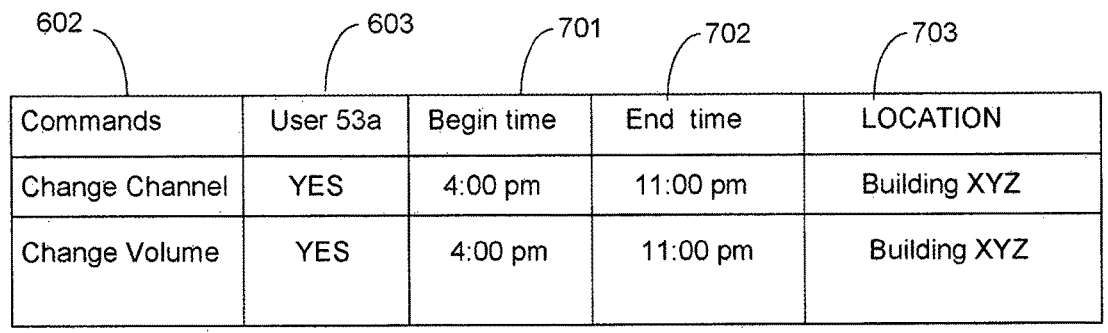
FIG. 7 is an illustration of an example editable permission record which includes time limits and/or location limits on the privileges granted to user, in accordance with the principles of the present disclosure.

While the device permission records (e.g., device permission record 400 and device permission record 600) been discussed only in the context of whether a guest user is being granted privileges (e.g., "YES") or not being granted privileges (e.g., "NO") without explicit reference to time or guest user location, it will be understood that the device permission records may include editable time and/or location privileges for a guest user. For example, device permission record 610 for television 12*h* may include a time limit granting user 53*a* privileges to issue Change Channel and Change Volume commands only between the hours of 4:00 pm and 11:00 pm, and/or only when the guest user is located, for example, in or near "Building XYZ". The location limit on user privileges may be used to preclude operation, for example, of Internet-connected devices (e.g., television 12*h*) by the guest user from a distance (e.g., from a next city, or from across town or country). User privileges for operating the electronic device may be granted only to a guest user within a predefined threshold distance of the electronic device (e.g., within a wireless coverage range of wireless network 121, within a same building or building complex as the electronic device, or in a same neighborhood as the electronic device, or otherwise proximate or in the vicinity of the electronic device, etc.). A predefined threshold distance for granting user privileges to the guest user may, for example, be a numerically quantified distance (e.g., 10 meters, 100 meters, 1000 meters, etc.). FIG. 7 shows an example editable permission record 700 (based on permission record 610) which includes time limits and location limits on the privileges granted to user 53*a*. Editable permission record 700 may be displayed to the owner in window 600 of display 500 (FIG. 6) for editing. Editable permission record 700 as shown, for example, may include values "4:00 pm," "11:00 pm" and "Building XYX," which may have been entered by the owner, under column headings "Begin time" 701, "End time" 702 and "Location" 703, respectively.

With renewed reference to FIG. 3 and, editing and sharing dialog generator 355, which may be configured to generate and present "sharing" dialogs (e.g., display 500, window 600, device permission record 400, device permission record 610, and device permission record 700, etc.) on the user interface of the owner's electronic device, may be further configured to generate a "sharing" notification informing a guest user of the electronic command privileges the guest user may have been granted by the owner (e.g., owner 104) to use or operate an electronic device in the set of electronic devices 120. The sharing dialog notification may be transmitted to the guest user via a communication system (e.g., e-mail, text messaging, social network or other network link) deployed or used by the owner's electronic device to connect with the guest user. Example sharing notifications may include details, for example, of which electronic commands the guest user can use and may also include details of which electronic commands the guest user is not allowed to use.

In an example "device sharing" use case in which the shared device in the set of electronic devices 120 is, for example, an Internet-connected HVAC system, and the third-party or guest user is a remote HVAC vendor, the owner (e.g., owner 104) may want the HVAC vendor to inspect the HVAC system, conduct diagnostics, or conduct system recalibration, but may not want the HVAC vendor to make any changes to a temperature setting. In such instance, the owner may use sharing dialogs (e.g., informational and interactive display 500 generated by editing and sharing dialog generator 355) to grant the HVAC vendor privileges to issue commands such as "retrieveDiagnostics" and "recalibrate", but deny privileges to issue a command such as "setTemp". A sharing notification sent by the owner may inform the remote HVAC vendor that privileges to issue commands such as "retrieveDiagnostics" and "recalibrate" have been granted but privileges to issue a command such as "setTemp" are not granted.

Figure 8B:
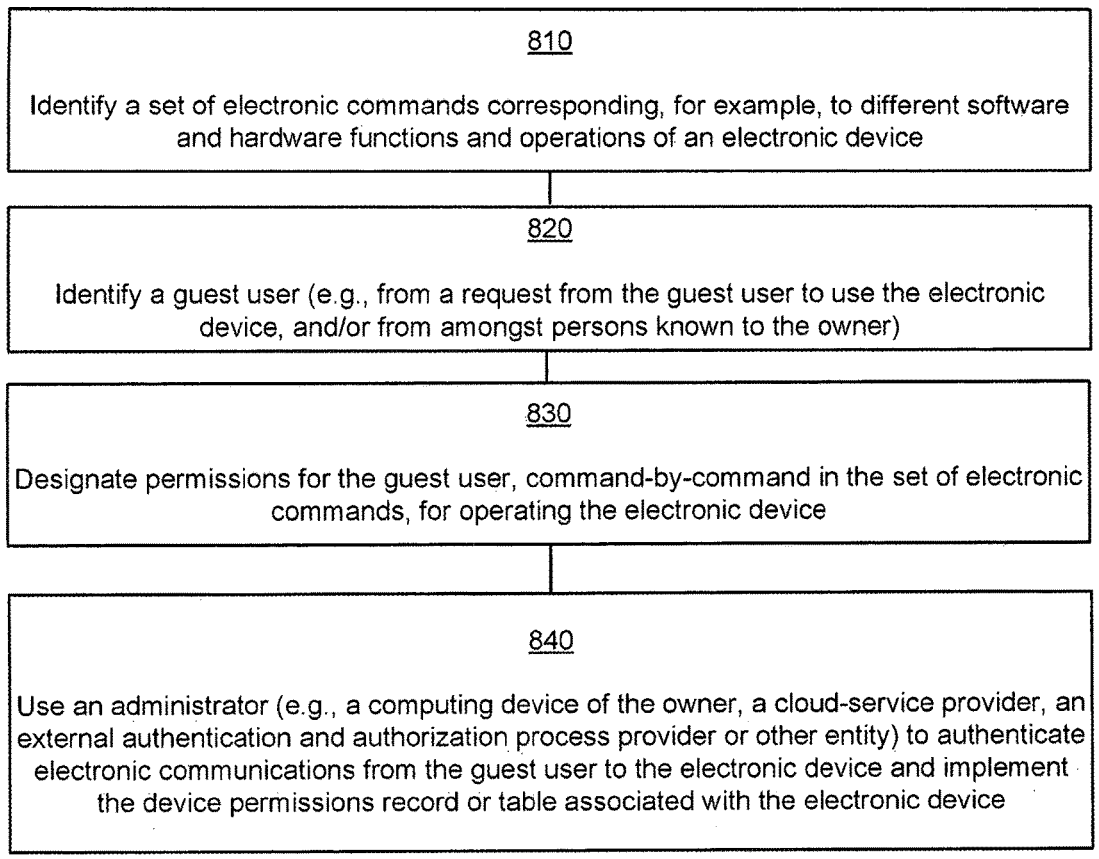

FIGS. 8A and 8B shows example method 80 and example method 800, respectively, by which a first-party user ("an owner") can share use of an electronic device with a third-party user ("a guest user"), in accordance with the principles of the disclosure herein. The electronic device may be one of a set of wireless-enabled or Internet-connected devices (e.g., televisions, cameras, video recorders, gaming consoles, audio players and stereo systems, entertainment devices, desktop computers, tablet computers, smart phones, mobile devices, printers, scanners, copiers, audio and video systems, telephone systems, smart sensors, electronic appliances, etc.) deployed by the owner, for example, in a home or business environment for personal use. The electronic device may be operable from another electronic device (e.g., a smart phone, a desktop computer, a laptop computer, a tablet computer, a notebook computer, a remote controller, etc.) via a wireless network or Internet link to the electronic device. The other electronic device that may be used to operate the electronic device may be the owner's device or the guest user's device.

Method 80, shown in FIG. 8A, may include identifying a set of electronic commands for operating an electronic device (81). Each electronic command in the set of electronic commands may be configured to trigger a corresponding operation of the electronic device. Method 80 may further include identifying a guest user (82). The guest user may be identified, for example, from a request from the guest user to use the electronic device, and/or from amongst electronic accounts connected to an owner account of the electronic device. Identifying the guest user 82 may, for example, include identifying a potential third party user of the electronic device from amongst electronic communication network connections to an owner account of the electronic device. The electronic communication network connections may, for example, include connections over electronic communication links such as Wi-Fi and LAN, and may, for example, include e-mail account connections, social media account connections, and electronic messaging service account connections, etc.

Method 80 may further involve receiving an instruction to designate, for the identified guest user, at least one permission for at least one electronic command in the set of the electronic commands for operating the electronic device (83). The at least one permission for the electronic command from the set of electronic commands may include one of denying or granting, the identified guest user, authority to trigger the corresponding operation of the electronic device.

Method 800, shown in FIG. 8B, may include identifying a set of electronic commands corresponding, for example, to different software and hardware functions and operations of the electronic device (810), identifying a guest user (820), and designating permissions for the guest user, command-by-command in the set of electronic commands, for operating the electronic device (830). The set of electronic commands may include at least one electronic command for operating the electronic device. Further, the designated permission for an electronic command may be positive (i.e. the guest user can issue or use the electronic command to operate the electronic device) or negative (i.e. the guest user cannot issue or use the electronic command to operate the electronic device).

In method 800, identifying a guest user 820 may include receiving a request (e.g., in person, via e-mail, via a social network or other electronic communication network) from the guest user to use the electronic device, and/or identifying a potential third-party user of the electronic device from amongst persons known to the owner (e.g., persons connected to the owner over electronic social media networks, e-mail networks, or other electronic communication networks). Identifying a guest user 820 may include determining that the guest user is within a predefined threshold distance of the electronic device (e.g., within a wireless coverage range of wireless network 121, within a same building or building complex as the electronic device, or in a same neighborhood as the electronic device, or otherwise proximate or in the vicinity of the electronic device, etc.). Further, identifying the guest user 820 may include authenticating the guest user and providing the guest user with authentication credentials (e.g., a user ID or password) for accessing the electronic device (e.g., via a wired, wireless or Internet link). An external authentication and authorization process provider (e.g., a cloud-service provider, an electronic social network provider, etc.) may be used for authenticating the guest user and providing the guest user with authentication credentials for accessing the electronic device.

In method 800, designating permissions for the guest user, command-by-command in the set of electronic commands, for operating the electronic device 830, may include editing or updating permission entries in a device permissions record or table associated with the electronic device, the device permissions record or table may include a listing of the electronic command(s) in the set of electronic commands for the electronic device, and, for each of the listed electronic commands, permission entries associated with or designated for the guest user.

Method 800 may include using an administrator (e.g., an electronic device of the owner, a cloud-service provider, the external authentication and authorization process provider mentioned above or other entity) to authenticate electronic communications (e.g., over wired, wireless or Internet links) from the guest user to the electronic device and implement the device permissions record or table associated with the electronic device (840).

In a version of method 800, designating permissions for the guest user, command-by-command in the set of electronic commands, for operating the electronic device 830, may include displaying an interactive sharing dialog on a user interface of an electronic device (used, for example, by the owner) for editing or updating permission entries in the device permissions record or table associated with the electronic device.

Displaying an interactive sharing dialog on the user interface of the electronic device may include displaying electronic device status information relating to an availability of the electronic device (which may be a wireless-enabled or Internet-connected device) for shared use by third-party users. The displayed electronic device status information may, for example, include information on whether the electronic device is discoverable or hidden from third party users over a wireless network or the Internet, or whether the electronic device is in a "locked" mode (i.e. the device is publicly discoverable over the wireless network or the Internet, but requires that a third party explicitly request access to use the device). The display of the interactive sharing dialog may include a display of interactive widgets (e.g., radio buttons) on the user interface of the electronic device, the interactive widgets configured to allow the owner/viewer to change a discoverable mode of the electronic device between "public," "hidden," and "locked" modes.

Displaying an interactive sharing dialog on the user interface of the electronic device may further include displaying an identifying visual representation(s) (e.g., a graphic or pictorial icon) of the guest user (and other known or potential third-party users) on the user interface of the electronic device. The identifying visual representation of the guest user may be displayed on the user interface of the electronic device, for example, in response to a request from the guest user for access to electronic device, and may serve as a reminder to the owner/viewer that a purpose of the interactive sharing dialog may be consideration of the guest user's request for access.

Displaying an interactive sharing dialog on the user interface of the electronic device may further include providing a link to or displaying an editable version of a device permissions record or table associated with the electronic device in an editing window on the user interface of the electronic device. Display of the editing window (e.g., a pop-up window) may be triggered, for example, by activation of an activable link provided in the interactive sharing dialog on the user interface of the electronic device. The editable version of the device permissions record or table displayed in the editing window may include a listing of the electronic command(s) in the set of electronic commands for the electronic device, and, for each of the listed electronic commands, input fields for permission entries associated with users. The owner/viewer of the sharing dialog may edit or update the editable version of the device permissions record or table associated with the electronic device in the editing window, for example, by entering permissions values (e.g., "yes" or "no", time values, location values, etc.) in the input fields for permission entries associated with the guest user.

Displaying an interactive sharing dialog on the user interface of the electronic device may further include generating a notification informing the guest user of the permissions granted to the guest user for access to and for operating the electronic device.

Method 80 and/or method 800 (in part and/or with extensions or variations thereof) may be used by a first-party user ("an owner") to customize sharing of electronic devices with different third-party users (e.g., "a first guest user" and "a second guest user"), in accordance with the principles of the disclosure herein. The "customized sharing" may involve designating different permissions and/or different sets of electronic commands to be shared with the different third-party users.

An example computer-implemented method for customizing sharing of electronic devices with different guest users (e.g., "a first guest user" and "a second guest user"), may, for example involve identifying a set of electronic commands for operating an electronic device and identifying the first guest user and the second guest user. The method may further involve receiving a first instruction to designate, for the first guest user, a first set of permissions for a first subset of electronic commands from the set of the electronic commands for operating the electronic device. The first set of permissions may include one of denying or granting, the first guest user, authority to trigger at least one corresponding operation of the electronic device.

The example computer-implemented method for customizing sharing of electronic devices with different guest users may further involve receiving a second instruction to designate, for the second guest user, a second set of permissions for a second subset of electronic commands from the set of the electronic commands for operating the electronic device, the second subset of electronic commands being different from the first subset of electronic commands.

A computer system (e.g., system 300) may be deployed to implement method 80 and/or method 800 (and extensions or modifications thereof) in conjunction with a non-transitory computer-readable storage medium (or media) having instructions stored thereon. The instructions when executed by one or more microprocessors (e.g., semiconductor-based hardware processors) may cause the computer system to implement method 80 and/or method 800 as described above, for example, with reference to FIG. 8A and FIG. 8B, respectively.

Figure 9:
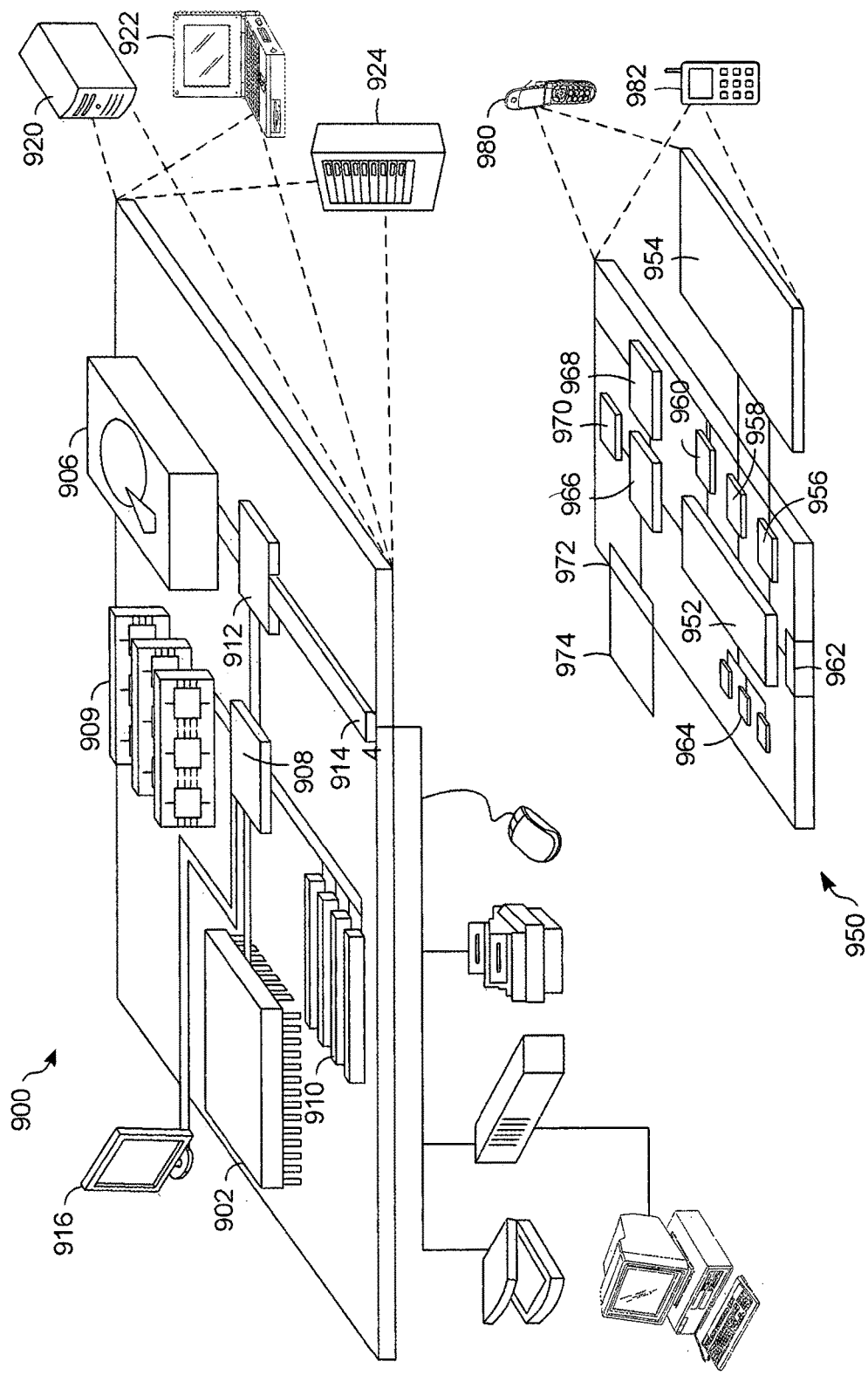
FIG. 9 is a schematic illustration of a generic computer device and a generic mobile device, which may be used with the techniques or in the systems described herein.

FIG. 9 shows an example of a generic computer 900 and a generic mobile device 950, which may be used with the techniques and the systems described herein. Computer 900 as shown is intended to represent various forms of digital computers, such as laptops, desktops, workstations, personal digital assistants, servers, blade servers, mainframes, and other appropriate computers. Computer 950 is intended to represent various forms of mobile devices, such as personal digital assistants, cellular telephones, smart phones, and other similar computers. The components shown here, their connections and relationships, and their functions, are meant to be exemplary only, and are not meant to limit implementations of the inventions described and/or claimed in this document.

Computer 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computer 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computers 900 may be connected, with each device providing portions of the necessary operations (e.g., as a server bank, a group of blade servers, or a multiprocessor system).

The memory 904 stores information within the computer 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computer 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computer 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computer 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computer 900 may be combined with other components in a mobile device (not shown), such as device 950. Each of such devices may contain one or more of computer 900, 950, and an entire system may be made up of multiple computers 900, 950 communicating with each other.

Computer 950 includes a processor 952, memory 964, and an input/output device such as a display 954, a communication interface 966, and a transceiver 968, among other components. The device 950 may also be provided with a storage device, such as a microdrive or other device, to provide additional storage. Each of the components 950, 952, 954, 966, and 968, are interconnected using various buses, and several of the components may be mounted on a common motherboard or in other manners as appropriate.

The processor 952 can execute instructions within the computer 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provided in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computer 950. The memory 964 can be implemented as one or more of a computer-readable medium or media, a volatile memory unit or units, or a non-volatile memory unit or units. Expansion memory 974 may also be provided and connected to device 950 through expansion interface 972, which may include, for example, a SIMM (Single In Line Memory Module) card interface. Such expansion memory 974 may provide extra storage space for device 950, or may also store applications or other information for device 950. Specifically, expansion memory 974 may include instructions to carry out or supplement the processes described above, and may include secure information also. Thus, for example, expansion memory 974 may be provided as a security module for device 950, and may be programmed with instructions that permit secure use of device 950. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 974, or memory on processor 952 that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, Wi-Fi, or other such transceiver (not shown). In addition, GPS (Global Positioning System) receiver module 970 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computer 950 may be implemented in a number of different forms, as shown in the figure. For example, it may be implemented as a cellular telephone 980. It may also be implemented as part of a smart phone 982, a personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the disclosure herein.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

A limited number of implementations of systems and methods for securely connecting devices to wireless networks have been described herein. Nevertheless, it will be understood that various modifications may be made without departing from the spirit and scope of this disclosure or the following claims.

What is claimed is:

1. A computer-implemented method comprising:
    identifying, by a computer system, a set of electronic commands for operating an electronic device, each electronic command configured to trigger a corresponding operation of the electronic device, the set of electronic commands comprising electronic commands that are transmitted via a network to direct the electronic device to perform the corresponding operation;
    identifying to an owner account of an owner of the electronic device, by the computer system, a first guest user, and a second guest user;
    receiving, by the computer system, a first instruction to designate, for the first guest user, a first set of permissions for a first subset of electronic commands from the set of the electronic commands for operating the electronic device, the first set of permissions for the first subset of electronic commands from the set of electronic commands including one of denying or granting, the first guest user, authority to transmit, using a first user device and via a network, at least one electronic command that is effective to direct the electronic device to perform at least one corresponding operation of the electronic device; and
    receiving, by the computer system, a second instruction to designate, for the second guest user, a second subset of electronic commands from the set of the electronic commands for operating the electronic device, the second subset of electronic commands being different from the first subset of electronic commands.

2. The method of claim 1, wherein identifying a guest user includes receiving a request from the guest user within a predefined threshold distance of the electronic device for access to the electronic device.

3. The method of claim 1, wherein identifying a guest user includes identifying a potential third party user of the electronic device from amongst electronic communication network connections to the owner account of the electronic device, the electronic communication network connections including at least one of e-mail account connections, social media account connections, and electronic messaging service account connections.

4. The method of claim 1, wherein identifying a guest user further comprises:
authenticating the guest user and providing the guest user with authentication credentials for accessing the electronic device via a wired, wireless or Internet link.

5. The method of claim 1, wherein receiving the first instruction to designate, for the first guest user, the first set of permissions for the first subset of electronic commands further comprises:
updating permission entries in a device permission record associated with the electronic device, the device permission record including a listing of the electronic commands in the set of electronic commands for operating the electronic device, and, for each of the listed electronic commands, permission entries associated with the first guest user.

6. The method of claim 5, further comprising:
authenticating an electronic communication from the first guest user to the electronic device; and
implementing the updated device permission record associated with the electronic device.

7. A system comprising:
a processor coupled to a memory;
a register of electronic devices including a subject electronic device;
a register of device permissions including a device permission record identifying the subject electronic device and including a listing of a set of electronic commands available for operating the subject electronic device;
a device permissions editor configured to receive external input for customizing the permissions associated with the listing of electronic commands included in the device permission record in response to a request to provide a guest user, within a predefined threshold distance of the subject electronic device, access to the subject electronic device; and
an authentication and authorization module configured to authenticate and authorize the guest user for connection to the subject electronic device via a wired, wireless, or Internet link, the authentication and authorization module configured to allow the guest user to communicate at least one electronic command over the wired, wireless, or Internet link to the subject electronic device according to the device permission record identifying the subject electronic device and privileges granted to the guest user for issuing the at least one electronic command to operate the subject device, the communication of the at least one electronic command being effective to direct the subject electronic device to perform at least one corresponding operation of the subject electronic device.

8. The system of claim 7, wherein the authentication and authorization module is hosted on a server on the Internet.

9. The system of claim 7, further comprising an editing and sharing dialog generator coupled to the device permissions editor, the editing and sharing dialog generator configured to present an interactive sharing dialog, the interactive sharing dialog being configured to facilitate receiving external input for customizing the permissions.

10. The system of claim 9, wherein the interactive sharing dialog includes information relating to an availability of an electronic device for shared use.

11. The system of claim 10, wherein the interactive sharing dialog includes a display of an editable version of the device permissions record associated with the electronic device in an editing window, the editable version of the device permissions record including a listing of at least a subset of the electronic commands in the set of electronic commands for operating the electronic device, and, for each of the listed electronic commands, input fields for permissions entries associated with the guest user.

12. The system of claim 11, wherein the editing window includes interactive data input elements to facilitate editing of the device permission record.

13. The system of claim 10, wherein the interactive sharing dialog is configured to generate an electronic notification informing the guest user of the permissions granted to the guest user for access to and for operating the electronic device.

14. The system of claim 10 further comprising a register of known third-party users, and wherein the interactive sharing dialog includes a visual graphic representation of at least one of the third party users.

15. A computer-implemented method comprising:
identifying, by a computer system, a set of electronic commands for operating an electronic device, each electronic command configured to trigger a corresponding operation of the electronic device, the set of electronic commands comprising electronic commands that are transmitted via a network to direct the electronic device to perform the corresponding operation;
identifying to an owner account of an owner of the electronic device, by the computer system, a first guest user, and a second guest user, identifying the first guest user or the second guest user including identifying a potential third party user of the electronic device from amongst electronic communication network connections to the owner account of the electronic device, the electronic communication network connections including at least one of e-mail account connections, social media account connections, and electronic messaging service account connections;
receiving, by the computer system, a first instruction to designate, for the first guest user, a first set of permissions for a first subset of electronic commands from the set of the electronic commands for operating the electronic device, the first set of permissions for the first subset of electronic commands from the set of electronic commands including one of denying or granting, the first guest user, authority to transmit, using a first user device and via a network, at least one electronic command that is effective to direct the electronic device to perform at least one corresponding operation of the electronic device; and
receiving, by the computer system, a second instruction to designate, for the second guest user, a second subset of electronic commands from the set of the electronic commands for operating the electronic device, the second subset of electronic commands being different from the first subset of electronic commands.

16. A computer-implemented method comprising:
identifying, by a computer system, a set of electronic commands for operating an electronic device, each electronic command configured to trigger a corresponding operation of the electronic device, the set of electronic commands comprising electronic commands that are transmitted via a network to direct the electronic device to perform the corresponding operation;

identifying to an owner account of an owner of the electronic device, by the computer system, a first guest user, and a second guest user;

receiving, by the computer system, a first instruction to designate, for the first guest user, a first set of permissions for a first subset of electronic commands from the set of the electronic commands for operating the electronic device, the first set of permissions for the first subset of electronic commands from the set of electronic commands including one of denying or granting, the first guest user, authority to transmit, using a first user device and via a network, at least one electronic command that is effective to direct the electronic device to perform at least one corresponding operation of the electronic device, the receiving the first instruction to delegate including:

updating permission entries in a device permission record associated with the electronic device, the device permission record including a listing of the electronic commands in the set of electronic commands for operating the electronic device, and, for each of the listed electronic commands, permission entries associated with the first guest user; and receiving, by the computer system, a second instruction to designate, for the second guest user, a second subset of electronic commands from the set of the electronic commands for operating the electronic device, the second subset of electronic commands being different from the first subset of electronic commands.

17. The method of claim 16, further comprising:
authenticating an electronic communication from the first guest user to the electronic device; and
implementing the updated device permission record associated with the electronic device.

18. A computer-implemented method comprising:
identifying, by a computer system, a set of electronic commands for operating an electronic device of an owner of the electronic device, each electronic command configured to trigger a corresponding operation of the electronic device, the set of electronic commands comprising electronic commands that are transmitted via a network to direct the electronic device to perform the corresponding operation;
identifying to an owner account of an owner of the electronic device, by the computer system, a first guest user, and a second guest user;

receiving, by the computer system, a first instruction to designate, for the first guest user, a first set of permissions for a first subset of electronic commands from the set of the electronic commands for operating the electronic device, the first set of permissions for the first subset of electronic commands from the set of electronic commands including one of denying or granting, the first guest user, authority to transmit, using a first user device and via a network, at least one electronic command that is effective to direct the electronic device to perform at least one corresponding operation of the electronic device;

updating permission entries in a device permission record associated with the electronic device, including displaying an interactive sharing dialog for updating permission entries in the device permission record associated with the electronic device; and receiving, by the computer system, a second instruction to designate, for the second guest user, a second subset of electronic commands from the set of the electronic commands for operating the electronic device, the second subset of electronic commands being different from the first subset of electronic commands.

19. The method of claim 18, wherein displaying the interactive sharing dialog further comprises:
displaying information relating to an availability of the electronic device for shared use with third-party users.

20. The method of claim 18, wherein displaying an interactive sharing dialog further comprises:
displaying an editable version of a device permission record associated with the electronic device in an editing window, the editable version of the device permissions record including a listing of the electronic commands in the set of electronic commands for operating the electronic device, and, for each of the listed electronic commands, input fields for permission entries associated with the guest user.

21. The method of claim 20, wherein displaying an interactive sharing dialog further comprises:
generating an electronic notification informing the guest user of the permissions granted to the guest user for access to and for operating the electronic device.

* * * * *